(12) United States Patent
Cohen (10) Patent No.: US 6,195,232 B1
(45) Date of Patent: Feb. 27, 2001

(54) LOW-NOISE TOROIDAL THIN FILM HEAD WITH SOLENOIDAL COIL

(75) Inventor: Uri Cohen, Palo Alto, CA (US)

(73) Assignee: ToroHead, Inc., Santa Clara, CA (US)

( * ) Notice: Subject to any disclaimer, the term of this patent is extended or adjusted under 35 U.S.C. 154(b) by 0 days.

(21) Appl. No.: 08/931,988

(22) Filed: Sep. 17, 1997

Related U.S. Application Data (63) Continuation of application No. 08/519,144, filed on Aug. 24, 1995, now abandoned.

(51) Int. Cl.[7] .............................. G11B 5/127; G11B 5/17
(52) U.S. Cl. ........................................... 360/126; 360/123
(58) Field of Search .................................... 360/123–127

(56) References Cited

U.S. PATENT DOCUMENTS

| | | | |
|---|---|---|---|
| 3,662,119 | 5/1972 | Romankiw et al. | 179/100.2 C |
| 4,016,601 | 4/1977 | Lazzari | 360/122 |
| 4,044,394 | 8/1977 | Hanazono et al. | 360/123 |
| 4,127,884 | 11/1978 | Nouchi et al. | 360/119 |
| 4,165,525 | 8/1979 | Koel et al. | 360/125 |
| 4,190,871 | 2/1980 | Walraven | 360/113 |
| 4,219,854 | 8/1980 | Church et al. | 360/113 |
| 4,223,360 * | 9/1980 | Sansom et al. | 360/123 |
| 4,315,291 | 2/1982 | Lazzari | 360/113 |
| 4,373,173 | 2/1983 | Robinson et al. | 360/121 |
| 4,376,337 | 3/1983 | Kobayasi et al. | 29/603 |
| 4,539,616 | 9/1985 | Yuito et al. | 360/125 |
| 4,639,811 * | 1/1987 | Diepers et al. | 360/125 |
| 4,652,954 | 3/1987 | Church | 360/120 |
| 4,695,351 * | 9/1987 | Mallary | 205/50 |
| 4,698,711 * | 10/1987 | Vinal | 360/113 |
| 4,743,988 | 5/1988 | Sato et al. | 360/126 |

(List continued on next page.)

FOREIGN PATENT DOCUMENTS 60-179903 * 9/1985 (JP) .
3-019113 * 1/1991 (JP) .
5-101323 * 4/1993 (JP) .

OTHER PUBLICATIONS

Suzuki, Toru et al.; "The thin film head for VCR," *Intermag* '95 (3 pages).

1988, Finn Jorgensen; *The Complete Handbook of Magnetic Recording, 3rd Edition* (4 pages). pp. 232–233.

Nov. 1979, Hanazono, M. et al; "Fabrication of 8 Turn Multi–Track Thin Film Heads," *IEEE Transactions on Magnetics* (3 pages) vol. Mag. No. 6, pp. 1616–1618.

*Primary Examiner*—William Klimowicz (57) ABSTRACT

The invention relates to a low-noise toroidal TFH device including a solenoidal or helical coil with low coil resistance and inductance, especially suitable for very high magnetic recording areal densities and channel frequencies. The length of a solenoidal coil turn is only about 20–30% that of an average turn in the conventional planar spiral coil design. This allows either reduction of the device thermal noise (by about 6 dB) and/or increase of the device operational frequency bandwidth (by a factor of 3–5). Also, the solenoidal coil coupling efficiency between each turn and the magnetic core is practically 100%, thereby improving the write and read-back efficiencies. Other features of the invention include a non-via large back-closure contact area between the bottom and top magnetic poles along their entire back-side width, and elimination of all other open branches and loose ends in the magnetic circuit. The magnetic core has a gradual, smooth toroidal (or a horse-shoe) shape with no loose ends, nooks, crevices, or sharp corners. The larger back-closure contact area decreases the magnetic core reluctance and improves the device efficiency. Utilization of a soft non-magnetic seed-layer, such as gold, eliminates interference noise due to the conventional magnetic (NiFe) seed-layer. Slight mechanical texturing (scratching) of the seed-layer along the intended easy axis helps to define and induce strong magnetic uniaxial anisotropy in the plated magnetic poles. All these features facilitate significant reduction of Barkhausen and other sources of device noise.

40 Claims, 5 Drawing Sheets

U.S. PATENT DOCUMENTS

| | | | |
|---|---|---|---|
| 4,791,719 | 12/1988 | Kobayashi et al. | 29/603 |
| 4,825,318 * | 4/1989 | Hoo et al. | 360/121 |
| 4,931,886 * | 6/1990 | Mallary | 360/55 |
| 4,972,287 * | 11/1990 | Das | 360/126 |
| 5,027,247 * | 6/1991 | Nakanishi | 360/126 |
| 5,059,278 | 10/1991 | Cohen et al. | 156/643 |
| 5,141,623 | 8/1992 | Cohen et al. | 205/122 |
| 5,163,218 * | 11/1992 | Hamilton | 29/603.12 |
| 5,164,869 * | 11/1992 | Fontana, Jr. et al. | 360/113 |
| 5,195,005 * | 3/1993 | Mallary et al. | 360/126 |
| 5,200,056 | 4/1993 | Cohen et al. | 205/122 |
| 5,313,356 * | 5/1994 | Ohkubo et al. | 360/126 |
| 5,326,429 | 7/1994 | Cohen et al. | 156/655 |
| 5,583,726 * | 12/1996 | Mizoshita et al. | 360/113 |

* cited by examiner

LOW-NOISE TOROIDAL THIN FILM HEAD WITH SOLENOIDAL COIL

This application is a continuation of application Ser. No. 08/519,144, filed Aug. 24, 1995, now abandoned.

BACKGROUND OF THE INVENTION

1. Field of the Invention

This invention relates to magnetic thin film heads (TFH) for recording and reading magnetic transitions on a moving magnetic medium. In particular, the invention relates to a low-noise toroidal TFH device having low coil resistance and inductance, especially suitable for very high magnetic recording areal densities and channel frequencies. It is applicable to either inductive or magnetoresistive (MR) heads with inductive write elements.

2. Background of the Prior Art

Magnetic TFH transducers are known in the prior art. See, e.g. U.S. Pat. Nos. 4,016,601; 4,190,872; 4,652,954; 4,791,719 for inductive devices and U.S. Pat. Nos. 4,190,871 and 4,315,291 for magnetoresistive (MR) devices.

In the operation of a typical inductive TFH device, a moving magnetic storage medium is placed near the exposed pole-tips of the TFH transducer. During the read operation, the changing magnetic flux from magnetized regions in the moving storage medium induces a changing magnetic flux in the pole-tips and the gap between them. The magnetic flux is carried through the pole-tips and yoke-shaped core and around spiraling conductor coil winding turns located between the yoke arms. The changing magnetic flux induces an electrical voltage across the conductor coil. The electrical voltage is representative of the magnetic pattern stored on the moving magnetic storage medium. During the write operation, an electrical current is caused to flow through the conductor coil. The current in the coil induces a magnetic field across the gap between the pole-tips. A fringe field extends into the nearby moving magnetic storage medium, inducing (or writing) a magnetic domain (in the storage medium) in the same direction. Impressing current pulses of alternating polarity across the coil causes the writing of magnetic domains of alternating polarity in the storage medium.

Magnetoresistive (MR) TFH elements can only operate in the read mode. The electrical resistance of an MR element varies with the direction of its magnetization orientation. Magnetic flux from the moving magnetic storage medium induces changes in this orientation. As a result, the resistance of the MR element to a sensing electric current changes accordingly. The varying voltage signal is representative of the magnetic pattern stored on the magnetic medium. An inductive element, optimized for writing, is used to record transitions in the magnetic medium.

In the manufacture of TFH transducers for magnetic recording, a large number of devices are fabricated simultaneously by depositing and patterning various layers on a ceramic wafer. When completed, the wafer is cut (or diced) and machined into individual sliders each having at least one transducer. The main elements of a TFH inductive transducer, roughly in the order in which they are deposited, are the (alumina) undercoat, the bottom magnetic pole, the flux gap material to provide spacing between the bottom and top magnetic pole-tips, one or more levels of electrical conductive spiraling coil windings interposed within insulation layers and located between the yoke arm parts of the bottom and top magnetic poles, the top magnetic pole, elevated studs (or posts) for connecting the coil to bonding pads (above the overcoat), a thick (alumina) overcoat, and the bonding pads. In the case of an MR TFH device, the MR read element, along with its shields, electrical leads, and biasing films (such as soft adjacent layer and/or exchange bias layer) are usually fabricated prior to the fabrication of the inductive write element.

The prior-art design of an inductive TFH transducer includes top and bottom magnetic poles (layers), each comprising a pole-tip tip and a yoke arm usually made of the alloy NiFe (permalloy). The magnetic poles are connected through a back-via in the back side of one of the yoke arms. They are separated by a planar spiraling coil(s) and insulation layers in the yoke arm region, and by a thin gap layer between the pole-tips in the front of the device. A typical prior-art TFH device is shown in FIGS. 1 and 2 of U.S. Pat. No. 4,190,872 (Feb. 26, 1980) to Jones et al, and in the front cover of Data Storage journal, the September 1994 issue. The latter is a top-view color microphotograph of an actual prior-art TFH device. These figures illustrate some of the serious drawbacks of the prior-art TFH device. Since the back-via accommodates only a small fraction of the back-width of the yoke arms, it restricts the magnetic flux there, causing a full or a partial saturation (during write operations), and thereby impairing the device efficiency and overwrite capability. The magnetic layer inside the via consists of multiple domains in various orientations which are subject to extreme levels of stress and stress gradients. These increase the device susceptibility to magnetic noise, due to magnetic domain wall movements, through magnetostrictive interaction.

In addition, domain structure and orientation in the remaining back portions (to the sides of the via), as well as in the back-via itself, are ill-defined, raising the likelihood of Barkhausen, "popcorn", and/or "wiggle" noise occurrence. For example, the magnetic flux in the "wings" portions of the pole (at the back to the left and right of the via) during write operations, is normal to the hard-axis orientation of the pole layer. This results in domain wall movements during and after write (as well as read) operations. Such domain wall movements result in magnetic noise. Often, the (top) magnetic layer is used for making electrical connections to other features, such as for electrical leads connecting the coil to the studs. An example of such electrical lead is clearly seen in the color photograph of Data Storage (the gray permalloy strip from the coil via to the left side of the coil). This is similar to coil lead 21 in FIG. 1 of U.S. Pat. No. 4,190,872, which is often constructed of plated permalloy (deposited during the plating of the top pole). Such portions of the magnetic circuit constitute open branches and loose ends having undesirable magnetic domains, orientations, and characteristics. These domains may backlash and relax at different times than the main core, thereby adding to the total device noise.

The long planar spiral coil turns of the conventional TFH device (cf. FIG. 1 of U.S. Pat. No. 4,190,872 and the color photo of Data Storage) are inefficient in coupling the magnetic flux in the core since they only wrap around a short fraction or segment of the core length (around the back-via). Also, most of each turn is located far from the magnetic core. The average turn efficiency is only about 65%. Furthermore, the long turns have large resistance and parasitic inductance which limit the attainable device frequency and aggravate thermal noise. The large coil resistance generates excessive heat during write operations. The excessive heat increases the device's Barkhausen, popcorn, and/or wiggle noise through magnetostrictive interaction of the magnetic core with thermal stresses. The latter are exerted by adjacent materials, having different thermal expansion coefficients, such as alumina and/or hard-baked insulation.

Another source for noise in the prior-art inductive TFH device is due to the seed-layer used for plating the magnetic poles. The magnetic properties of the seed-layer are often quite different from those of the plated magnetic layers. In particular, the magnetic orientation, coercivity, and hard axis anisotropy field of the NiFe seed-layer may be quite different from that of the plated NiFe layers. As a result, the different signal produced from the seed-layer (which is part of the magnetic core) is superimposed as a source of noise. Also, interfacial mechanical stress exerted between the seed-layer and the plated NiFe magnetic pole may contribute to the device's noise. Since the seed-layer usually consists of NiFe of somewhat different composition and microstructure than the plated alloy, the stress level and direction of the seed-layer can be different from that of the plated NiFe layers. The different stress may adversely affect the device noise through magnetostrictive interaction with the plated NiFe layers.

SUMMARY OF THE INVENTION

According to the present invention, the TFH device's noise level is significantly reduced by allowing the bottom and top magnetic poles to contact each other along their entire back-side width (of the yoke arms), and by eliminating all other open branches and loose ends in the magnetic circuit. The larger contact area between the poles at their back-side also decreases the magnetic circuit reluctance, thereby improving the device efficiency. In order to minimize the device noise, the ideal magnetic core should have a gradual, smooth toroidal (or a horseshoe) shape with no vias, loose ends, nooks, crevices, or sharp corners. Also, no ferromagnetic material should be used for coil leads, or anywhere else, besides the magnetic core.

In another embodiment of the invention, a non-magnetic seed-layer(s) eliminates the noise contribution due to the commonly used magnetic seed-layer. This seed-layer(s) must satisfy several requirements: It must be compatible for plating the (NiFe) magnetic layer upon it, it must have good adhesion to the substrate, good electrical conductivity, and must not increase the corrosion susceptibility of the plated NiFe pole-tips. For reducing stress related noise, the non-magnetic seed-layer should consist of a mechanically soft metal or an alloy which possesses low internal stress to accommodate and absorb interfacial and internal stresses of the plated NiFe layer. The preferred seed-layer is a combination comprising either Au over Cr adhesion layer (Au/Cr) or Au over Ti adhesion layer (Au/Ti). In addition, a type of mechanically induced uniaxial magnetic anisotropy can be utilized to improve easy-axis orientation of the magnetic poles. The seed-layer, or the substrate underneath, can be mechanically textured, for example, by light scratching along the desired easy-axis direction, prior to plating the NiFe magnetic poles. The scratching can be on an atomic scale (about 5–50 Å deep), and can be readily produced on the soft metallic seed-layers, such as Au, Pd, or Pt, by brushing or wiping along the desired direction. Alternatively, the mechanical texture can be produced on the substrate prior to the deposition of the magnetic poles (with or without a seed-layer).

In order to increase the read-back signal output, the read element should include the maximum possible number of coil winding turns. The efficiency of each coil turn ought to be maximized. In accordance with the present invention, the coil has a solenoidal or helical shape. The coil winding turns in this design are completely and closely wrapped around the yoke arms (poles) over most of the core length, thereby ensuring effective coupling with the magnetic core. All the coil turns of the solenoid winding are situated along the width of the magnetic yoke arms, in a substantially normal direction to the direction of the magnetic flux flow in the magnetic yoke arms during write and/or read operations. There is only one direction for the magnetic flux flow in each magnetic pole: along the longitudinal, or hard axis of the yoke arm. In contrast, in the conventional planar spiral coil different portions of each turn induce magnetic flux in different directions in the yoke arm. While the induced flux direction in the front is along the longitudinal, or hard axis, the induced magnetic flux in the "wings" portions of the yoke arm (on both sides of the via) is along the transverse direction, or easy magnetic axis. The latter is a source of magnetic noise due to magnetic domain-wall movements. In the conventional spiral coil all windings are wrapped over a short segment of the magnetic core (at the back-via). Also, only a small fraction of each turn length is wrapped around the magnetic core, while the rest of it contributes to parasitic leakage inductance. As a result, the spiral coil does not couple effectively the coil turns to the magnetic core. While the efficiency of each turn in the solenoid coil is close to 100%, it is only about 45–75% in the conventional planar spiral coil design.

The coil resistance and inductance are very important factors for low-noise and high frequency device performance. They ought to be minimized in order to reduce the device thermal noise and improve high frequency channel operation. The solenoid coil of the invention facilitates a much lower resistance, by a nominal factor of about 6, compared with the resistance of the conventional planar spiral coil. Decreasing the coil resistance by this factor facilitates reduction of the head thermal noise by a factor of about 2.45. This corresponds to an improvement of the thermal signal to noise ratio (SNR) by 7.8 dB! Alternatively, by maintaining the same thermal noise level as in the conventional spiral coil TFH design, the feasible bandwidth of the toroidal TFH device can be increased by a factor of about 6! Lowering the total coil inductance L can also expand the operational device frequency. The solenoid coil significantly eliminates the parasitic coil inductance and associated noise of the spiral coil. Using this design, it is possible to increase the read-back signal output while lowering the total coil resistance, reducing device noise, and increasing the channel frequency.

Accordingly, one object of the invention is to provide a novel toroidal TFH magnetic transducer device with significantly improved efficiency and lower noise level, and which can operate at substantially higher frequencies than existing transducer devices.

Another object of this invention is to provide a toroidal TFH device with fewer winding turns, significantly lower coil resistance and inductance, and which provides significantly improved performance over the state-of-the-art TFH devices.

A further object is to provide a toroidal TFH device that has a greatly reduced level of thermally generated electrical noise as compared to state-of-the-art devices.

Another object of the invention is to provide a toroidal TFH device of the type described which has significantly improved frequency bandwidth for writing and reading magnetic data.

A further object is to provide a toroidal TFH device of the type described with substantially lower Barkhausen, popcorn, and/or wiggle noise by providing a full-width contact in the back-closure of the magnetic poles.

Another object is to provide a toroidal TFH device of the type described with substantially lower Barkhausen, popcorn, and/or wiggle noise by eliminating all open branches, nooks, crevices, and sharp corners in the magnetic core.

An additional object is to provide a toroidal TFH device of the type described with substantially lower Barkhausen, popcorn, and/or wiggle noise than prior art transducers by providing a mechanically soft non-magnetic seed-layer(s) for plating the magnetic poles.

Yet another object is to provide a toroidal TFH device of the type described with improved uniaxial magnetic anisotropy by using mechanical texturing of the seed-layer and/or the substrate prior to the deposition of the magnetic poles.

These and other objects and advantages of the present invention will no doubt become apparent to those skilled in the art after having read the following detailed description of the preferred embodiment which is illustrated in the several figures of the drawing.

DESCRIPTION OF THE PREFERRED EMBODIMENTS

Figure 1:
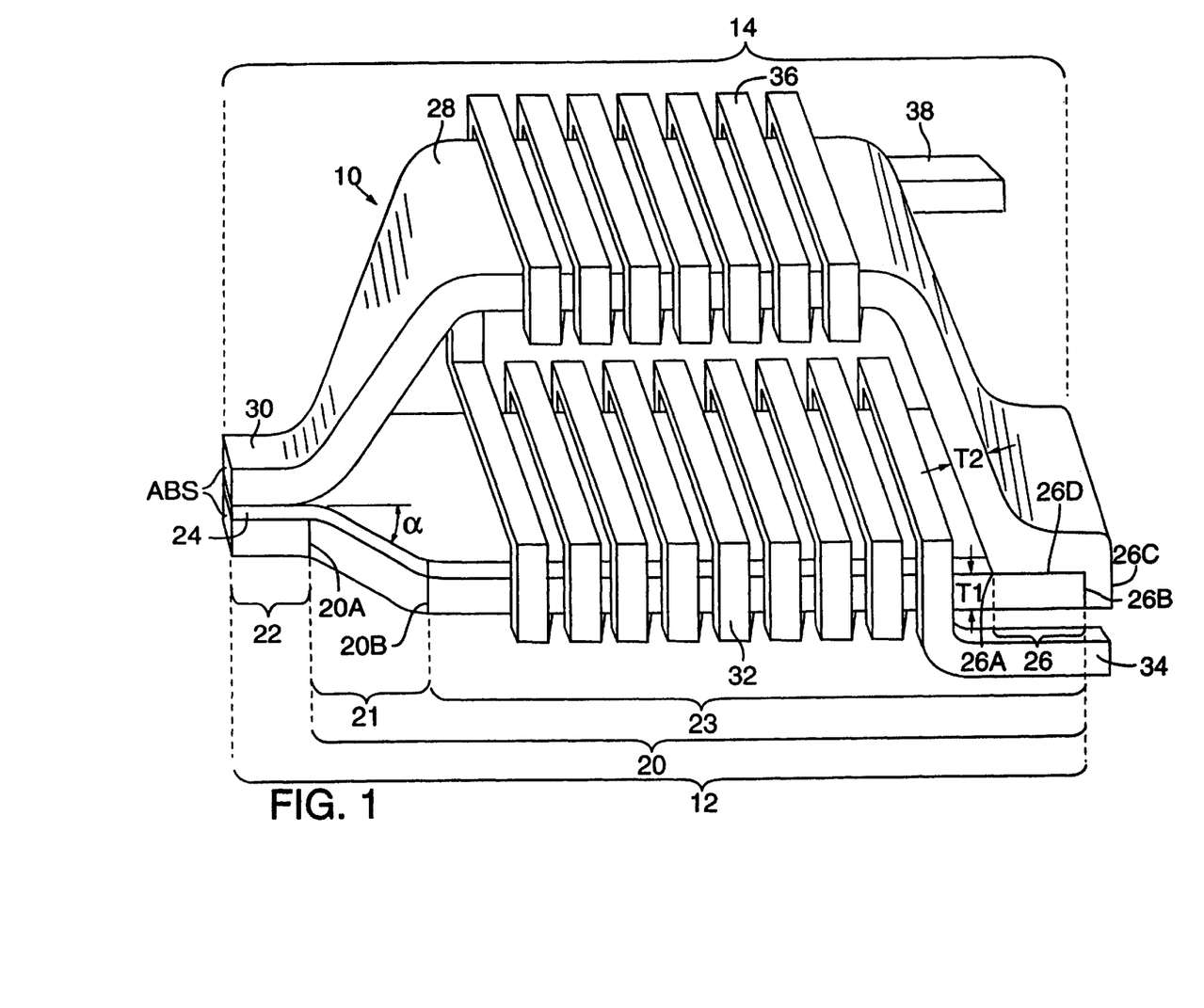
FIG. 1 is a perspective schematic view illustrating the principal components of the TFH device according to this invention.

FIG. 1 is a schematic perspective view showing at 10 the principal components of a TFH device according to the present invention. The drawing is not to scale. Each magnetic pole 12, 14 comprises a relatively large yoke arm 20, 28 and a relatively small pole-tip 22,30. The bottom yoke arm 20 includes an elongated back portion 23 extending between onset point 20B and back-end 26B of essentially constant width, and a fan-like front transition portion 21 of increasing width commencing at pole-tip 22 and extending between 20A and onset point 20B. Top yoke arm 28 has essentially the same shape as bottom yoke arm 20 when viewed from the top.

Figure 1A:
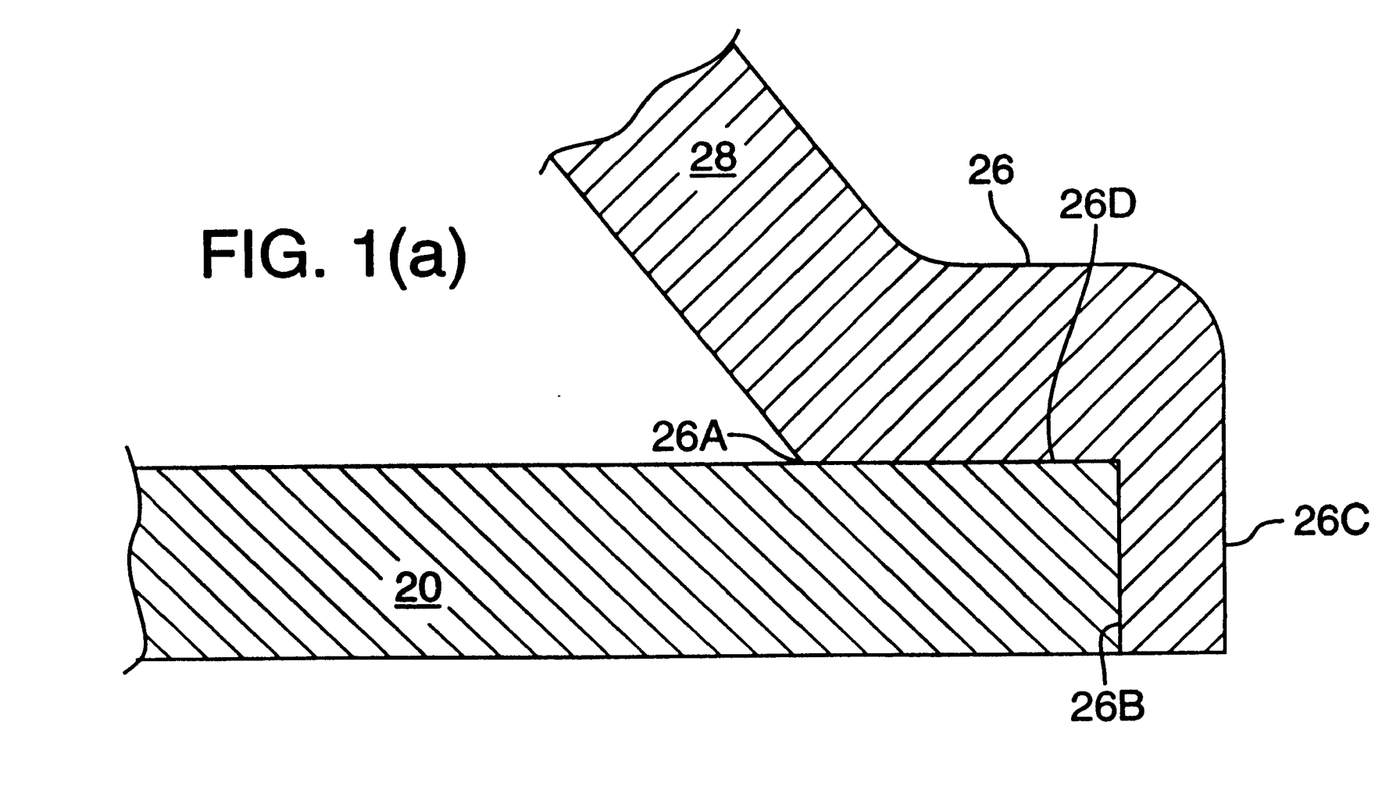
FIG. 1(a) shows a cross-section detail of the back-closure region of the embodiment of FIG. 1.

In another embodiment, the essentially constant width back portion of the pole is replaced with other, non-constant width shapes (not shown), such as a tapered width from a wider back-end to a narrower onset point. The taper angle of the tapered back portion of the pole of such embodiment would not exceed the angle α of the fan-like transition region 21. The bottom magnetic yoke arm 20 and the top magnetic yoke arm 28 contact each other, along substantially their entire width, at the back-closure region 26. The meaning here of "contact each other, along substantially their entire width" means intimate magnetic, physical contact along at least 90%, and preferably along at least 95%, of the width of the back-ends of the yoke arms. Back-closure region 26 is shown in more detail in FIG. 1(a) and consists of a large contact area 26D between the yoke arms with smooth and clean features. The back-closure region does not include a via or any sharp steps, corners, loose ends, crevices, or nooks. This results in significantly reduced Barkhausen, popcorn, and/or wiggle noise, and elimination of any flux constriction there. In order to ensure sufficient contact area, the back closure region length (equal to the distance between point 26A, the inner-most point of contact between the yoke arms 20, 28, and the back-end 26B of bottom pole 12, the outer-most contact between the poles) should be at least equal to the thickness (T1 or T2) of the thinner of the yokes 20, 28. Preferably, this distance should be between 1.2–2.0 times the thickness of the thinner of the yoke arms 20, 28. Back-ends 26B and 26C may terminate along the same line. However, due to natural process variations of misregistration or misalignment, back-end 26C might be shorter than 26B (to the left of 26B in FIG. 1(a)), resulting in undesirable sharp step corners. In order to prevent such a situation, back-end 26C of top yoke arm 28 should preferably be slightly longer, i.e. extend to the right of 26B in FIG. 1(a), and wrap around back-end 26B of bottom yoke arm 20. Preferably, the distance between 26B and 26C should not exceed the thickness of top yoke arm 28. This last requirement is well within the capability of conventional photolithography. The larger back-closure contact area of this embodiment decreases the core reluctance, thereby improving the device efficiency and overwrite capability.

Also illustrated in FIG. 1 are serially connected solenoidal coils 32 and 36 which are schematically shown wound about the yoke arms 20 and 28, respectively.

Coils 32 and 36 are shown as heavy lines in order to illustrate the manner in which they are wound around the bottom and top magnetic poles in a solenoid style. In this manner, the magnetic poles 12, 14 and coils 32, 36 together form a structure that operates somewhat like a toroidal magnetic core, and the winding covers a substantial length of the magnetic core, thereby improving the coupling efficiency of each turn. The coil winding turns in the solenoid are completely and closely (or tightly) wrapped around the poles 12, 14 over most of the core length, thereby ensuring effective coupling with the magnetic core. All the coil turns of the solenoid winding are situated along the yoke arms, producing substantially a single direction of magnetic flux flow in each magnetic pole along the longitudinal or hard axis direction, during write operations. During read operations the flux direction induced in the core by the stored magnetic data in the storage medium is still in a single direction (along the core's hard axis) at any point in time.

In contrast, in the conventional planar spiral coil, such as that disclosed in U.S. Pat. No. 4,190,872, different portions of each turn induce magnetic flux of different directions in different portions of each yoke arm. While the induced flux direction in the front portion is along the longitudinal, or hard axis, the induced magnetic flux in the "wings" portions of the yoke arm (on both sides of the via) is along the transverse direction, or easy magnetic axis. The latter is a source of magnetic noise due to magnetic domain-wall movements. All the turns of the spiral coil are wrapped over a short length of the magnetic core (at the back-via) thereby impairing the effective coupling between the coil and the magnetic core. Also, only a small fraction of the length of each turn in the conventional spiral coil is wrapped close to the magnetic core, while the rest of it is located far from the core. Since for each wire segment the induced magnetic field strength is inversely proportional to the distance from the wire segment, most of the spiral coil wire contributes little to the core field during write operations. Similarly, much of the spiral coil contributes little to the induced voltage during read operations, but adds a significant parasitic leakage inductance. As a result, the spiral coil does not couple effectively the coil turns to the magnetic core. While the efficiency of each turn in the solenoid coil is essentially close to 100%, it is only about 45–75% in the conventional planar spiral coil.

The solenoidal coil of the present invention can achieve the same read-back signal output level as the spiral coil, using only about ⅔ the number of winding turns. The coil resistance and inductance are very important factors for low-noise and high frequency device performance. They ought to be minimized in order to reduce the TFH device thermal noise and improve high frequency channel operation. The length of each winding turn of the solenoid coil is shorter by a factor of about 3–5 compared with the average winding turn of the conventional spiral coil. Assuming the same number of turns and the same winding cross-section, the solenoid coil has a lower total resistance, by a factor of 3–5, compared with the conventional spiral coil. However, less (about ⅔) turns of the solenoid coil produce the same signal output as the conventional spiral coil. For example, a 30-turn solenoid coil produces essentially the same output signal as produced by a 45-turn spiral coil. This allows even lower total coil resistance, by a factor of about 4.5–7.5, compared with the conventional spiral coil. According to "The Complete Handbook Of Magnetic Recording", 3rd edition by Finn Jorgensen, Tab Books, 1988, Page 232, the thermal resistance noise associated with the coil is given by:

$$V_{noise}=(4kTBR)^{1/2} \text{ volts}$$

where k is the Boltzman constant ($1.38 \times 10^{-23}$ J/° K), T is the temperature in ° Kelvin, B is the bandwidth in Hertz, and R is the resistance value in Ohms. It is clear from this relationship that the higher the coil resistance and/or the higher the bandwidth, the noisier the device. Thus, decreasing the coil resistance by a nominal factor of 6, should facilitate reduction of the thermal noise by a factor of 2.45. This corresponds to an improvement of the thermal signal to noise ratio (SNR) of 7.8 dB! Alternatively, by maintaining the same thermal noise level as the conventional spiral coil TFH design, the feasible bandwidth of the solenoid coil TFH device can be increased by a factor of 6! It can thus dramatically reduce the device thermal noise at high frequencies.

The contribution of the head thermal noise is particularly important at very high bandwidth frequencies. Lowering the total coil inductance L will also expand the operational device frequency, since the circuit resonance frequency is proportional to $1/(L)^{1/2}$. The solenoid coil substantially eliminates the parasitic coil inductance and associated noise of the spiral coil. In addition, the large coil resistance of the conventional spiral coil generates excessive heat during write operations. The excessive heat in the prior art device increases the device's (Barkhausen, popcorn, and/or wiggle) noise through magnetostrictive interaction of the magnetic core with thermal stresses. The latter are exerted on the magnetic core by adjacent materials having different thermal expansion coefficients, such as alumina or hard-baked insulation. In contrast, the low resistance of the solenoid coil of the present invention significantly reduces such noise.

Figure 2:
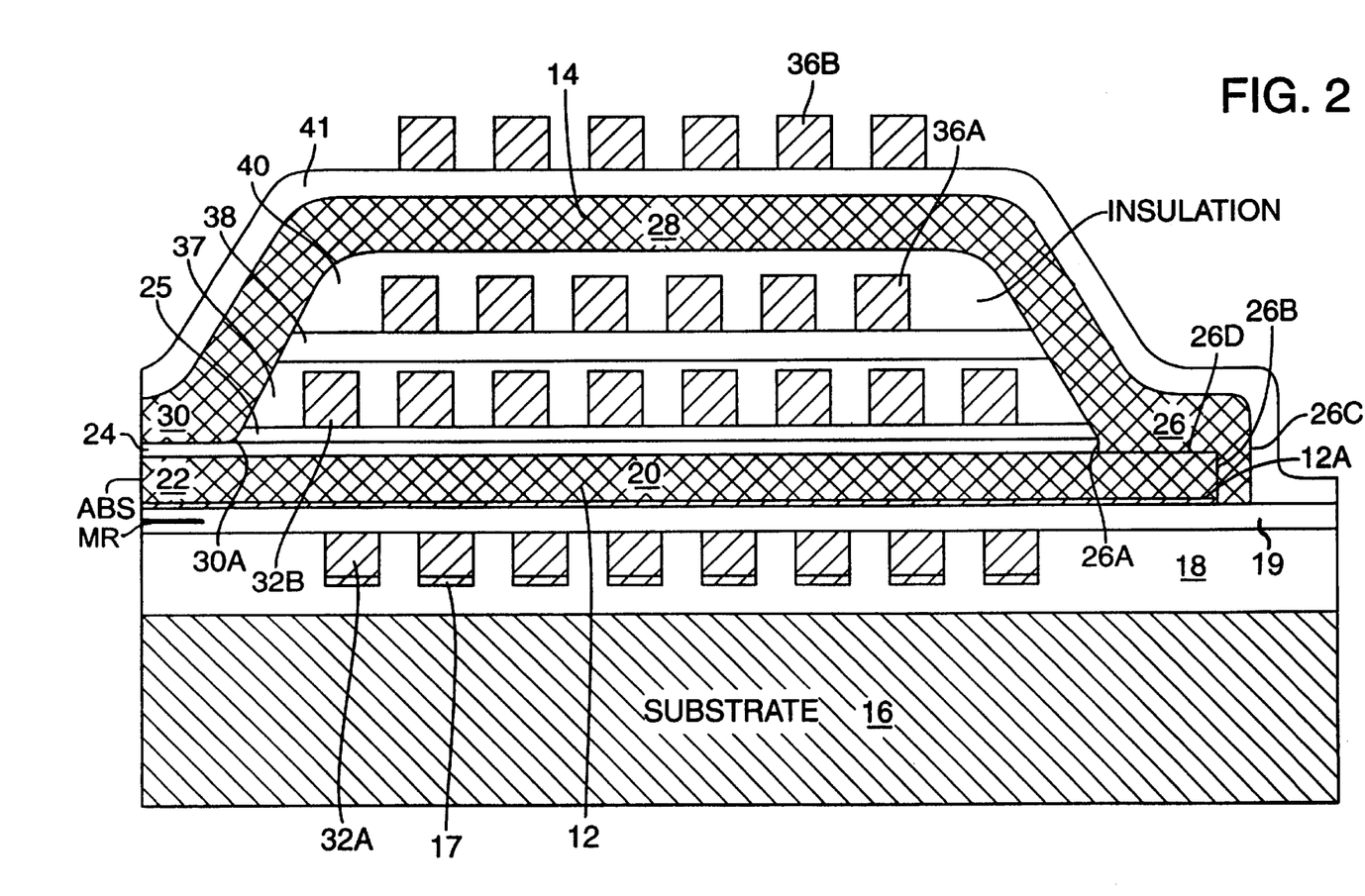
FIG. 2 is a schematically illustrated longitudinal cross-section view of a TFH device according to a preferred embodiment of the invention and implementing the model of FIG. 1.

FIG. 2 (not to scale) is a longitudinal cross-section of a toroidal TFH device using thin film technology according to a preferred embodiment of the present invention. The device is fabricated over a suitable substrate 16 and highly polished undercoat 18. The substrate may be comprised of the usual $Al_2O_3$—TiC ceramic, glass, or other ceramics such as photoceram, calcium-titanate, or silicon carbide. Undercoat layer 18 and an insulative layer 19 may be comprised of deposited $Al_2O_3$, $SiO_2$, or SiO. As shown, an optional MR element may be formed in insulative layer 19. Actual implementation using thin film technology and fabrication procedures includes the step-by-step addition of magnetic core members and conductive strips which are ultimately interconnected to form the multiplanar equivalent of a solenoid coil helically wound about the core members. The yoke arms 20, 28 are underlaid by a coil portion 32A, separated by coil portions 32B and 36A, and overlaid by coil portion 36B and insulation layers. On their front sides, the magnetic poles include the bottom magnetic pole-tip 22 and the top magnetic pole-tip 30. The pole-tips are separated by gap layer 24. Their throat height begins at the zero throat point 30A, the inside point where the poles begin to diverge from each other, and terminates at the air bearing surface (ABS) of the slider, at the front of the device. The length of the throat height is the distance between zero throat point 30A and the ABS. The exact location of the ABS is determined by careful lapping of a surface cut perpendicular to the wafer's surface (following completion of the wafer fabrication), using auxiliary means, such as electric lapping guides (not shown). Along their length the pole-tips are separated by a thin gap layer 24 that usually consists of sputtered alumina. In order to provide intimate magnetic contact between the poles at back-closure region 26, the gap layer 24 should be removed from that region prior to the formation of top magnetic pole 14. This is further described below.

Figure 3A:
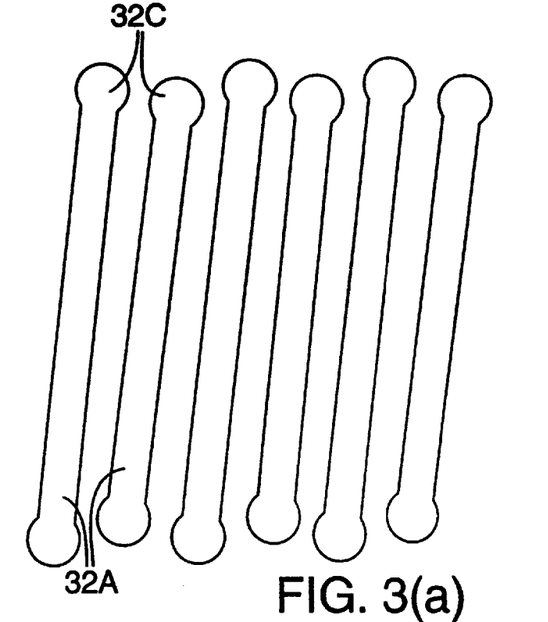
FIGS. 3(a)–3(d) are plan views illustrating various stages during the fabrication of the TFH device of FIG. 2.

FIGS. 3(a)–3(d) are a series of schematic (not to scale) plan views of various stages during the fabrication of the toroidal TFH device according to a preferred embodiment of the present invention. Since thin film technology does not permit the winding of a conductor about a pole piece, an analog of a conductive winding must be built up in stages such as those depicted in the drawings. These stages relate to the fabrication of bottom pole 12 and solenoid coil 32 "wrapped" around it (cf. FIG. 1). Similar stages are later utilized to fabricate top pole 14 and its solenoid coil 36 (cf. FIG. 1). To construct the lower portion of winding 32, a pattern of elongated conductor bars 32A with enlarged staggering terminals or contact pads 32C are first formed in the undercoat layer 18, as shown in FIG. 3(a). The conductor bars will constitute the bottom half portion of the bottom pole's coil winding. The enlarged ends 32C of the conductor bars 32A provide terminals or contact pads (allowing for adequate misalignment) for connection with the conductors 32B (FIG. 2) of the top half portion of the bottom pole's coil winding 32. The terminals are staggered in order to reduce the feasible spacing between adjacent conductor turns. The conductors 32A are comprised of a highly conductive metal such as Cu, Au, Pd, Pt, Ag, or Al. The metal strips can be electroplated or deposited by a dry vacuum method, such as evaporation or sputter deposition. In the preferred embodiment, grooves having the pattern of FIG. 3(a) are first etched into the alumina undercoat 18. The depth of the grooves is slightly over the required thickness of the coil conductors 32A (about 3–5 μm). The grooves can be formed in undercoat 18 by the method described in U.S. Pat. No. 5,326,429 (Jul. 5, 1994) to Cohen et al, incorporated herein by reference. The same method can also be utilized to form craters in undercoat layer 18 for other recessed features, such as the bottom magnetic pole and other coil and insulation layers. This may be particularly important for improved planarization and pole symmetry of TFH devices with multi coil levels. The highly conductive coil metal is then deposited onto the entire surface of layer 18 to fill the grooves.

Next, the wafer is lapped to a flush flat surface, thereby removing the metal in all locations, except inside the grooves. A thin adhesion metal 17 (in FIG. 2) is required under the highly conductive metal (except Al) in order to ensure adequate adhesion. The adhesion metal may consist of Cr, Ti, NiFe, Ta, Nb, Zr, W, Mo, and alloys comprising one or more elements thereof. When the conductive metal is deposited by a dry vacuum technique, a thickness of about 100–300 Å of the adhesion metal is sufficient. For a plated conductive metal, a seed-layer (17 in FIG. 2) with a thickness of about 500–2,000 Å is required prior to plating. In the latter case, the seed-layer must have both good electrical conductivity and good adhesion to the alumina undercoat. A combination of seed-layers such as Cu/Cr or Cu/Ti is quite common.

In an alternative embodiment, the conductive coil pattern of FIG. 3(a) can be constructed by a method described in U.S. Pat. No. 5,059,278 (Oct. 22, 1991) to Cohen et al, incorporated herein by reference. According to that method, a selectively etchable seed-layer 17 (consisting of a different metal than the conductive coil metal) is first deposited over the alumina undercoat. A photoresist plating mask, with openings having a pattern similar to FIG. 3(a), is then formed over the seed-layer. The conductive metal coil is then plated through the plating mask. Finally, the photoresist mask is stripped off and the seed-layer is removed (from all other areas except under the coil) by a selective wet chemical etching which leaves the plated coil intact. Alternatively, the seed-layer 17 is etched non-selectively by a dry or a wet etching technique.

Following the construction of the bottom portion of the bottom coil (32A in FIG. 2), an insulative layer 19 (in FIG. 2) is deposited over the conductor bars 32A in order to insulate the latter from the magnetic bottom pole 12. In the preferred embodiment, layer 19 consists of $Al_2O_3$, $SiO_2$, or SiO. Alternatively, layer 19 may consist of a patterned hard-baked photoresist, a regular polyimide, or a photosensitive polyimide.

Figure 3B:
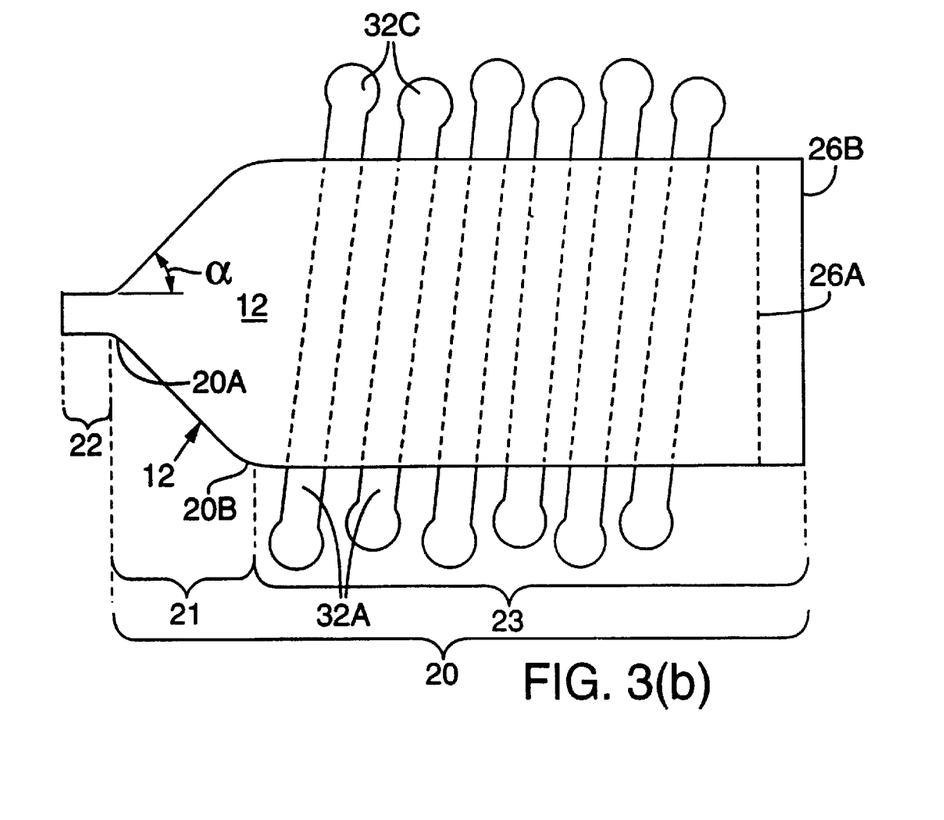
Figure 3C:
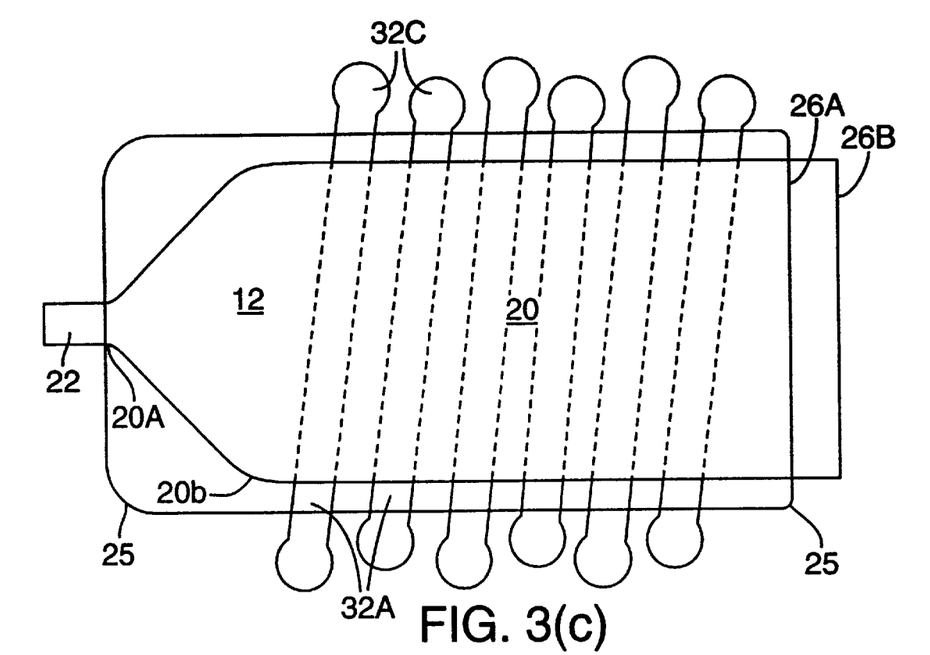

FIG. 3(b) shows the next stage, after depositing and forming the bottom magnetic pole 12 over insulative layer 19 (in FIG. 2). Magnetic pole 12 may consist of the conventional NiFe alloy (permalloy) with a composition of about 81–83% Ni and 17–19% Fe. It may also consist of other ferromagnetic materials with large magnetic saturation ($B_s$) and permeability ($\mu$) and low coercivity ($H_c$) and anisotropy field ($H_k$). For low magnetic noise, the ferromagnetic pole material should possess zero or low magnetostriction ($\lambda_s$). To enable high frequency operation of the device, eddy currents should be minimized in the magnetic poles. This can be accomplished by using a ferromagnetic material with poor electrical conductivity (insulators are the best) or by laminating metallic magnetic poles with non-magnetic insulating layers. Conventional permalloy and other alloys based on CoFe can conveniently be electroplated through a (photoresist) mask onto a metallic seed-layer. All ferromagnetic materials, including laminated structures which comprise alternating magnetic and non-magnetic insulating layers, can be deposited by dry methods such as sputtering. Desirable ferromagnetic materials may include NiFe, CoZr, CoNbZr, CoTaZr, FeSi, FeAlSi, FeN, FeAlN, FeTaN, CoFe, CoNiFe, CoFeB, and the like. While electroplating is a more economical method (than the dry techniques) to form the magnetic poles, it is limited to a few alloys and to a single layer. Laminating electroplated ferromagnetic alloys (with insulating non-magnetic layers) requires extra steps for repeating the seed-layer, the plating mask, and the plating for each additional ferromagnetic layer. The dry techniques require shaping the magnetic poles after the deposition of the layer. This can be accomplished by ion-milling, reactive ion etching (RIE), wet-etching, or a lift-off technique. The dry techniques offer the advantages of a wide variety of materials and combinations, including laminations and high $B_s$. Poles with high magnetic saturation ($B_s$) are required to produce the high write-field required for good overwriting of high coercivity magnetic media. The latter is required for high recording density. Laminated structures of alternating ferromagnetic and insulating layers substantially reduce degradation (or roll-off) of the permeability with frequency, thereby substantially increasing the device operational frequency (or bandwidth). It appears certain that future fabrication of TFH devices will include more dry processing of the magnetic poles.

In the conventional electroplating of the magnetic poles, a magnetic metallic seed-layer 12A (in FIG. 2) is first deposited over the wafer surface by sputtering or evaporation. This layer is required for electrical continuity necessary for electroplating (the magnetic pole). A photoresist (frame) electroplating mask is then formed over the seed-layer. Next, the wafer is placed in an electroplating bath from which the ferromagnetic pole is electrodeposited through the mask. The plating mask is then removed, and the seed-layer, as well as plated ferromagnetic layer everywhere except the magnetic pole, is removed by dry and/or wet etching. In one embodiment of the invention, a non-magnetic seed-layer(s) eliminates the noise contribution due to the commonly used magnetic seed-layer. The seed-layer(s) must not increase the corrosion susceptibility of the plated NiFe layers when exposed to the environment (the pole-tips in the air bearing surface). The seed-layer(s) must also have adequate adhesion to the substrate, good electrical conductivity, and be compatible for plating the (NiFe) magnetic layer upon it. In order to reduce stress related noise, the non-magnetic seed-layer should preferably consist of a mechanically soft metal or an alloy which possesses low internal stress. Such a seed-layer can accommodate and absorb interfacial and internal stresses of the plated NiFe layer. Examples of desirable seed-layers include a metal such as Au, Pd, Pt, Ag, and alloys comprising one or more elements thereof, deposited over an adhesion layer selected from the group consisting of Cr, Ti, Ta, Nb, Zr, Mo, W, and alloys comprising one or more elements thereof. Other seed-layers may include the group of Cd, In, Sn, Pb, and alloys comprising one or more elements thereof. The latter can be used as either a single seed-layer, or over an adhesion layer selected from the group consisting of Cr, Ti, Ta, Nb, Zr, Mo, W, and alloys comprising one or more elements thereof. The preferred seed-layer is a combination comprising either Au over Cr adhesion layer (Au/Cr) or Au over Ti adhesion layer (Au/Ti).

Mechanically induced uniaxial magnetic anisotropy can be utilized in order to improve easy-axis orientation of the magnetic poles. For example, the seed-layer, or the substrate underneath, can be mechanically textured, such as by light scratching along the desired easy-axis direction, prior to plating the NiFe magnetic poles. The intended easy-axis, in the plane of the magnetic pole, should be parallel to the transverse or width direction of the yoke arm, and normal to the hard-axis along the longitudinal or length direction of the yoke arm. The hard-axis of the yoke arm is the direction of the magnetic flux flow in the yoke arm during write and read operations, which is normal to the track direction (in the storage medium). During idle periods, most of the magnetic domains relax to orientations along the easy-axis. The scratching can be on an atomic scale (about 5–50 Å deep), and can be readily produced on the soft metallic seed-layers, such as Au, Pd, Pt, Ag, Cd, In, Sn, or Pb by brushing or wiping along the desired direction. Similar mechanical texture can be produced on NiFe seed-layer also by brushing or wiping along the desired easy-axis direction. Alternatively, the mechanical texture may be produced on the substrate prior to the deposition of the magnetic poles (with or without a seed-layer). The latter may be particularly suitable for dry (or vacuum) deposition of the magnetic poles, which does not require any seed-layer. In one embodiment, a soft Al layer is deposited and mechanically textured prior to a dry deposition of the magnetic pole(s). The soft Al layer absorbs or accommodates the interfacial stress of the magnetic layer. The mechanical magnetic anisotropy, thus introduced in the magnetic poles, facilitates uniaxial easy-axis magnetic orientation along the texture direction. The improved easy-axis orientation reduces undesirable domain walls and related noise in the device. In addition, the magnetic anisotropy introduced by the mechanical texturing may significantly assist to reduce, or completely eliminate, the presently required strong orienting magnetic field during the plating of NiFe films. The orienting magnetic field is presently produced by a heavy, cumbersome, and expensive permanent magnet or an electromagnet. The presently required orienting field must be highly uniform and of several thousand Oersteds strength. Such magnets or electromagnets are very costly, particularly those designed for the larger wafer ($\geq 6$" diameter) plating cells.

As indicated above, FIG. 3(b) shows the shape of the bottom magnetic pole 12 according to a preferred embodiment of the present invention. This pole consists of a yoke arm 20 and a pole-tip 22. The yoke arm includes an essentially constant width back portion 23 (between onset point 20B and the back-end 26B). The yoke arm also includes a fan-like, neck, or transition front portion 21 between onset point 20B and point 20A, the beginning of the pole-tip portion. For achieving the strongest possible write-field, point 20A should coincide with zero-throat point (30A in FIG. 2), and the throat height should be less than the thickness of the thinner of magnetic pole-tips 22, 30. This will ensure saturation of the pole-tips prior to any other location. However, sometimes it is desirable to saturate the neck region prior to the pole-tips in order to prevent amplitude and resolution roll-off at excessively high write currents. In this case, it may be advantageous to retain in the neck a portion of the pole-tip to the left of 20A with the narrow constant width. Also, it may be quite difficult to align point 20A with the zero throat point, particularly for the top magnetic pole with its high topography, due to natural process deviations. For these reasons, a small portion of the pole-tip to the left of 20A may be included in the neck region. Using thicker poles and/or pole materials having high $B_s$ should also increase the feasible write-field. For a typical NiFe alloy pole material, the thickness of the poles is in the range of 2–5 $\mu$m, and preferably in the range of 3–4 $\mu$m. The length of the yoke arm portion 23 between 20B and 26B (with constant width) ought to be minimized in order to improve device efficiency and to reduce its inductance. However, the length should be sufficient to accommodate all the coil turns and adequate spacings between them. Densely spaced turns may have a pitch of about 4.0–6.0 $\mu$m, with about equal width for the lines and spacings. Even more densely spaced turns will become feasible in the foreseeable future. In one example (described in more detail below), the bottom pole may have 16 turns, with line width of 3.0 $\mu$m and spacing width of 2.5 $\mu$ (or 5.5 $\mu$m pitch). The top pole may have 14 turns of similar lines and spacings width. This will require a bottom yoke arm length of about 80–100 $\mu$m. Note, however, that although FIG. 3(b) shows all the turns to be located between 20B and 26A, one or more (actually 3–4) turns can be placed in the fan-like front transition region 21 of the yoke arm in order to increase the number of turns and to improve efficiency. The width of the yoke arm back portion 23 between onset point 20B and back-end 26B should be optimized with regard to efficiency on one hand, and inductance and coil resistance on the other. The device efficiency improves with the width (increased cross-section for the flux), but inductance and coil resistance also increase with the width. A desirable ratio between the width and the length of the yoke arm is about 0.4–0.7, and more preferably 0.5–0.6. In the example, a desirable width of the yoke arm back portion 23 should be about 45–55 $\mu$m. The angle a of the fan-like portion 21 of the yoke arm determines the length of this portion. While device efficiency increases with this angle, so does the inductance and the magnetic (Barkhausen, popcorn, and/or wiggle) noise. A desirable value for $\alpha$ is between 30–60°, and preferably 40–50°. The width of the pole-tips determines the written track width (on the magnetic storage medium). The narrower the pole-tips, the narrower the tracks. However, the output signal is directly proportional to the width of the pole-tips. The current state-of-the-art width of the pole-tips is in the range of 3–5 $\mu$m. Much narrower pole-tips (and tracks), even below 1 $\mu$m, will become prevalent in the foreseeable future.

Following formation of the bottom magnetic pole 12, a non-magnetic gap layer (24 in FIG. 2) is deposited over that pole. The purpose of this layer is to create a magnetic transducing gap between pole-tips 22 and 30 (in FIG. 2). The gap layer 24 usually consists of sputtered alumina. However, other non-magnetic materials, such as insulative $SiO_2$ or SiO, or even conductive or semiconductive materials can be utilized. The thickness of the gap layer is optimized with regard to resolution (or linear density along the track) on one hand, and overwrite and efficiency on the other. A thinner gap layer improves resolution (or linear density) but degrades overwrite and efficiency. The state-of-the-art gap length (or gap thickness) is currently in the range of 0.2–0.4 $\mu$m, and is decreasing yet. It is likely that this thickness will be further reduced to 0.1–0.2 $\mu$m, or even less, in the foreseeable future. In order to provide intimate magnetic contact between the poles at back-closure region 26, gap layer 24 (in FIG. 2) should be removed from that region prior to the deposition of top magnetic pole 14. This can be done by either a wet or by a dry etching (through a gap-etch mask) of the gap layer there. Removal of the gap layer at the back-closure region can be done at any stage following the gap deposition but prior to the deposition of top pole 14. In the preferred embodiment, gap layer 24 is etched in the back-closure region 26 just prior to the deposition of top pole 14. This prevents contamination of the back-closure contact area during earlier processing steps of coil and insulation fabrication. For etching the gap at any stage, the gap-etch mask may consist of either photoresist alone or, preferably, a photoresist on top of a thin metallic layer, such as NiFe or Cr. The latter technique is described in more detail in the first named Applicant's Pending patent application Ser. No. 07/963/783 (filed on Oct. 20, 1992), incorporated herein by reference. A wet gap etchant may include hot phosphoric acid or, preferably, dilute (about 1:10) HF in water. Dry etching can be accomplished by ion-milling, sputter-etching, or reactive ion etching (RIE). In the preferred embodiment, the gap-etch mask consists of a thin layer (100–300 Å) of NiFe with a photoresist layer overlaying it. The wet chemical gap-etchant consists of dilute (1:10) HF in water. This technique provides very high fidelity pattern-etching with virtually no undercutting, even with very long overetch (up to 400%). The wet etching is isotropic, thereby ensuring complete removal of the gap layer from all hard to access locations, such as the step at back-end 26B.

FIG. 3(*c*) shows the stage after an insulation layer 25 has been deposited and patterned over gap layer 24 and bottom magnetic pole 12 (in FIG. 2). This layer consists of a hard-baked (cured) photoresist or polyimide. The purpose of this layer is to increase the separation, and ensure complete insulation, between magnetic pole 12 and its half top coil portion 32B (cf. FIG. 2). Since the gap layer is rather thin, it may not have complete step coverage over the edges of pole 12, thus resulting in electrical shorts between the coil and the core. Also, the very thin gap may result in capacitive coupling between the two. In an alternative embodiment of the invention, with adequate step coverage by gap layer 24, insulation layer 25 can be omitted altogether. Insulation layer 25 is one of several insulation layers used in the device fabrication. They all consist of either hard-baked photoresist or polyimide and serve for insulation and/or planarization. The outer-most insulation layer defines the location of zero throat point 30A (cf. FIG. 2). In the preferred embodiment, the outer-most insulation layer is the top insulation layer 40 prior to the deposition of top pole 14. It insulates coil portion 36A from the top pole 14. This produces smooth slopes of top magnetic pole 14 at its front and back portions, with minimum or no bumps or mounds (cf. FIG. 2), thus reducing related Barkhausen, popcorn, and/or wiggle noise. However, the outer-most insulation layer can also be the bottom insulation layer 25 or any insulation layer therebetween. If layer 25 is the outer-most insulation, then its front end defines the location of zero throat point, and its back-end can be used to define the front edge location 26A of back-closure region 26. In the preferred embodiment, as shown in FIG. 3(C), insulation layer 25 extends on the sides to a short distance from the coil contact pads 32C. These pads must remain exposed to facilitate contacts with the top half portion of the bottom pole's coil. It is also possible to extend insulation layer 25 beyond pads 32C provided, however, that its pattern contains vias overlapping and exposing the contact pads.

Vias must be formed in insulative layer 19 and gap layer 24 over the contact pad terminals 32C (FIG. 3(*a*)) in order to facilitate contacts between the bottom and top pad terminals of the bottom pole's coil. In the case of layer 19 consisting of $Al_2O_3$, $SiO_2$, or $SiO$, the vias can be photolithographically defined and etched at any stage prior to the formation of top half portion 32B (in FIG. 2) of the bottom coil bars. In one embodiment, the etching is done just prior to the deposition of coil bars 32B. At this stage, gap layer 24 is already in place, thus combining the pattern-etching of the two layers into a single operation. In addition, the delayed etching prevents contamination of the vias during earlier processing steps. In the case of insulative layer 19 consisting of hard-baked (fully cured) photoresist or polyimide, the side borders of this layer are defined by photolithography to extend to within a short distance from the contact pads. Alternatively, layer 19 extends beyond the contact pads, but vias exposing the latter are defined by photolithography prior to curing it.

FIG. 3(*d*) shows the stage after deposition and patterning of the top half portion 32B of the bottom pole's coil over insulation layer 25. Terminals or contact pads 32C in the conductor pattern allow the completion of the bottom pole's solenoid coil. Terminal or contact pad 32D serves for connecting the bottom pole's solenoid coil with the top pole's solenoid coil after it is formed. Terminal 34 of the conductor pattern is one of the (two) coil leads. The other one, terminal 38, is shown in FIG. 1. The leads connect the coil to bonding studs or posts, or directly to the device bonding pads (not shown). The latter serve for wire bonding to an external read/write channel circuit. In the preferred embodiment, coil terminals 34 and 38 are located near the back of the TFH device. This facilitates efficient utilization of the real estate near the device, and minimizes the leads resistance. In alternative embodiments, the terminals can be located in the front of the device, or one in the front and the other one in the back of the device. Also, a solenoid coil may be wrapped around only a single pole under certain circumstances. This may be the case when an inductive write element is combined with an MR read element.

Another possibility is when one inductive element, optimized for write function, is combined with another inductive element, optimized for read function. Such an inductive write element may require less winding turns. A single pole's solenoid coil simplifies the device construction in a very substantial way. In other alternatives, various combinations of pole's windings are possible. For example, it is possible to construct more than a single level of winding on one or both poles. It is also possible to have more levels of winding layers wrapped around one pole than on the other pole. Similarly, it is possible to construct similar number of winding levels on each pole, with equal or different number of turns wrapped around each pole.

Figure 3D:
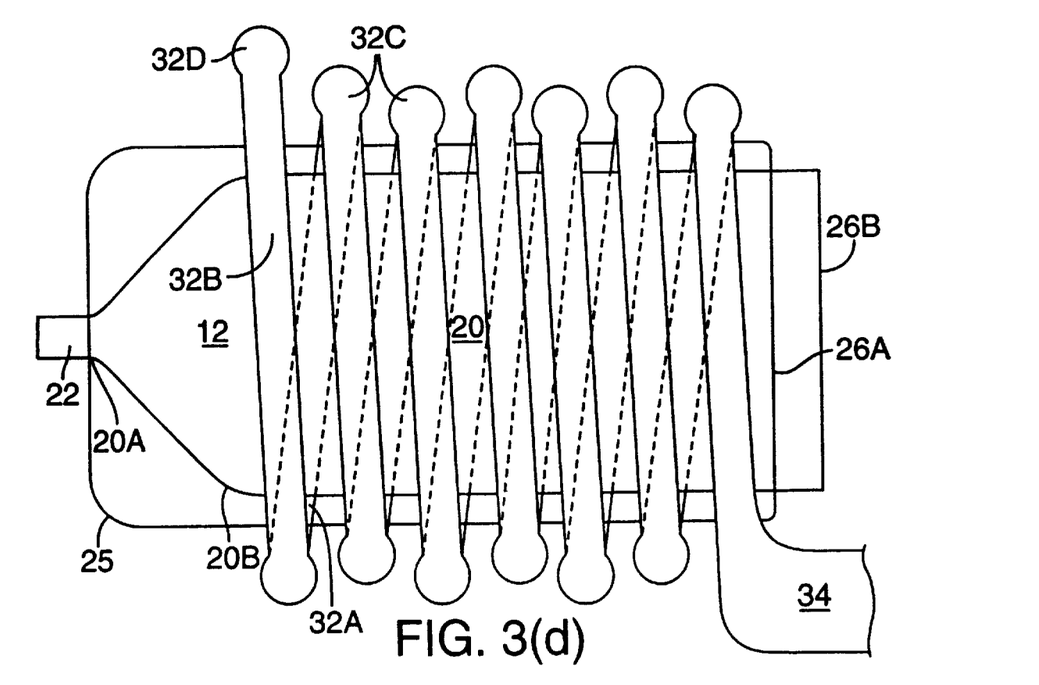

The top half portion 32B of the bottom pole's solenoid coil is fabricated in a similar way to the bottom half portion 32A of the coil. Similar conductor materials and fabrication techniques can be utilized. In the preferred embodiment, this layer is constructed by plating through a photoresist mask onto a selectively etchable seed-layer, utilizing the method of U.S. Pat. No. 5,059,278, as described above. Alternatively, coil layer 32B can be formed by dry techniques, or by the usual electroplating technique, as described above for coil layer 32A. FIG. 3(*d*) shows contact pad 32D to be located ahead of the other contact pads 32C. This is to emphasize that contact pad 32D is unique in that it provides continuity contact to the top pole's coil 36A. In reality, however, this pad may also be located along the same line like the rest of contact pads 32C.

The rest of the fabrication of the toroidal TFH device is similar to that previously described and uses similar materials, patterns, and fabrication steps. For this reason, the remaining steps are mostly described with reference to FIG. 2. Following the construction of coil layer 32B, one or more insulation layers consisting of hard-baked photoresist or polyimide, is deposited and patterned over coil layer 32B. Usually, two insulating layers 37 and 38 are used prior to the construction of coil layer 36A. The first layer 37 is used to fill in the spaces between coil turns 32B. The second insulation layer 38 is used to planarize the surface prior to the construction of coil layer 36A, and to provide sufficient insulation between coil layers 32B and 36A. However, a single, rather thick, insulation layer may be used for both purposes. Similarly, one or more insulation layer(s) 40 are deposited and patterned over coil layer 36A in order to fill in the spaces between its turns, planarize the surface, and insulate coil layer 36A from the top magnetic yoke arm 28. The insulation layers between the bottom magnetic yoke arm 20 and the top magnetic yoke arm 28 are collectively designated as "Insulation" in FIG. 2. They consist of hard-baked (or cured) photoresist and/or cured polyimide. The latter may consist of a regular or a photosensitive polyimide.

All the insulation layers are patterned prior to curing. The curing of a hard-baked photoresist can be carried out by baking for several hours at a temperature ranging between 200–250° C., under vacuum or inert atmosphere. Hard-baking is often carried-out under external magnetic field to ensure proper orientation of the easy axis of the poles. Polyimide usually requires higher curing temperature. This may adversely affect the magnetic properties of the NiFe poles, which begin to deteriorate at temperatures above about 250° C. The contact pads of coil layers 36A and 36B can be placed beyond the sides borders (or extent) of the insulation layers, or within vias defined in the insulation layers. In the preferred embodiment, these pads are placed beyond the side borders of the insulation. Although such placement increases slightly the length (and resistance) of each turn, it simplifies the fabrication process by eliminating contact vias and the associated risk of poor electrical contact due to contamination or insulation residues inside them. Also in the preferred embodiment, all insulation layers following the construction of coil layer 32B are placed over and cover (or insulate) contact pads 32C. They extend on both sides of the device beyond contact pads 32C, but do not cover contact pad 32D. The latter provides a connection to the top pole's coil through the first (or last) contact pad of coil layer 36A. As described above, the outer-most insulation layer between yoke arms 20 and 28 defines zero throat point 30A. In the preferred embodiment, the outer-most layer is the top insulation layer 40 (under yoke arm 28). The outer-most layer can also be used to define the inner-most point 26A of the back-closure region 26.

Construction of the bottom half portion of the top pole's coil layer 36A is similar to the construction of coil layer 32B. In the preferred embodiment, the method of U.S. Pat. No. 5,059,278 is used to form this layer. A selectively etchable seed-layer (not shown) is deposited over the insulation layer 38. A plating photoresist mask (not shown) is then formed over the seed-layer, and coil layer 36A (consisting of another metal than the seed-layer) is plated through the mask onto the seed-layer. The plating mask is then removed and the seed-layer is selectively etched from between the turns. The pattern of coil layer 36A includes contact pads which provide continuity to the bottom pole's coil (through pad 32D) and to the top half portion of the top pole's coil layer 36B. The contact pads' pattern is similar to that of coil layers 32A and 32B. In general, the top pole's coil includes fewer turns than the bottom pole coil. The reason is that there is less space along the top pole, as can be seen in FIG. 2. In the example discussed below, the bottom pole solenoid coil includes 16 turns while the top pole solenoid coil includes 14 turns.

One or more insulation layer(s) 40 is now deposited and patterned over coil layer 36A. Provisions are made to ensure that the contact pads connecting to the top half portion of the coil are not blocked by this layer. As described above, this can be best accomplished by not covering the contact pads by this insulation layer(s). This means that the side borders of this insulation layer(s) only extend to within a short distance from the pads. Note, however, that at this stage continuity contact between coil layers 32B and 36A has already been formed at pad 32D. It is therefore desirable to cover this contact by the top insulation layer. As described above, in the preferred embodiment the gap-etch operation to clear the back-closure region 26 is delayed until this stage. This ensures clean surface of this region prior to the deposition of the top magnetic pole.

The top magnetic pole 14 can be constructed of similar materials, and formed in a similar way to those of bottom pole 12. Either the same magnetic material or a different one than the bottom pole can be used. Like the bottom magnetic pole, the top magnetic pole can be laminated for improved high frequency response. The thickness of the magnetic poles may be the same or different from each other. In particular, poles consisting of different magnetic materials may also have different thickness. The shape of the top magnetic pole is essentially similar to that of the bottom magnetic pole 12 (cf. FIG. 3(b)). The pole-tips may have different widths. In particular, it is a common practice to design a wider bottom pole-tip than the top pole-tip. It is also possible to construct one or more of the magnetic poles with wider pole-tip than its final width, and then trim the pole-tip(s) to its final width. Such pole-trimming is described for example in U.S. Pat. No. 5,141,623 (Aug. 25, 1992) and U.S. Pat. No. 5,200,056 (Apr. 6, 1993) to Cohen et al, incorporated herein by reference. The topography of the top pole is usually worse than that of the bottom pole. Most of the top pole is situated at a higher elevation than the pole-tip. This may cause Barkhausen, popcorn, and/or wiggle noise due to uncompensated stresses, the presence of unfavorable domains, and domain pinning in the slopping regions. Also, for a plated top magnetic pole, the unfavorable topography of the top pole adversely affects its composition uniformity across a device. Composition non-uniformity across a TFH device is known to increase its noise. The top pole topography aggravates the difference in the plating mask aspect ratios between the back portion of the yoke arm and the pole-tip region. This causes depletion of iron ions (the minor constituent in the NiFe plating bath) inside deep and narrow openings (pole-tips), compared with wide and shallow openings in the yoke arm portions. The topography of the top pole can be improved (or planarized) by embedding the bottom pole, as well as several coil and insulation layers, in a recessed crater etched in the undercoat, as described above (cf. U.S. Pat. No. 5,326,429).

Next, an insulation layer 41 is deposited over the top magnetic pole 14. In one embodiment, this layer consists of $Al_2O_3$, $SiO_2$, or SiO. The purpose of layer 41 is to insulate top magnetic pole 14 from the coil layer 36B. It must have adequate step coverage over the sides of pole 14. For this reason, the thickness of layer 41 ought to be at least 0.5 $\mu$m, and preferably be in the range of 1.0–3.0 $\mu$m. Also in this embodiment, layer 41 may extend over the entire length of the device; from the ABS to the back-end 26C, and beyond, as seen in FIG. 2. However, when layer 41 consists of $Al_2O_3$, $SiO_2$, or SiO, it may exert stress on the top magnetic pole, thereby increasing the Barkhausen, popcorn, and/or wiggle noise. Also in this embodiment, vias must be etched in layer 41 in order to expose the underlaying contact pads of coil layer 36A.

In an alternative embodiment, insulation layer 41 consists of a hard-baked photoresist or polyimide. These insulation materials are softer and exert little or no stress on the top magnetic pole 14, thereby reducing the device's noise. In this embodiment, the insulation layer is first deposited and patterned, prior to its curing. The insulation patterning leaves exposed the contact pads of coil layer 36A, as described above for coil layers 32B and 36A. Also in this embodiment, the insulation layer 41 does not extend in the front all the way to the ABS, in order to avoid its smearing and/or cause degradation of structural integrity there. In this case, the insulation layer may extend in the front up to the end of the top flat region, but not over the front slopping region of the top pole. In the back of the device, this layer may extend all the way to back-end 26C, or beyond. The hard-baked photoresist or polyimide insulation layer may extend on the sides of the device to within a short distance from the contact pads, as described above for coil layer 36A.

Construction of the top half portion of the top pole's coil layer 36B is similar to the construction of previous coil layers, such as 32B or 36A. Contact pads, similar to those of coil layer 32B should overlay the contact pads of coil layer 36A. An electrical lead (38 in FIG. 1), similar to 34 in FIG. 3(d), but on the other side of the device, is provided in the pattern of coil layer 36B. This lead connects the coil to the other terminal with a stud and/or bonding pad, where wire bonding connects the device to the external channel circuit.

The final step in the wafer fabrication includes the deposition of an overcoat or an encapsulation layer (not shown) over the entire wafer surface. The overcoat layer may consist of $Al_2O_3$, $SiO_2$, or SiO. In the preferred embodiment, this layer consists of relatively thin (10–15 μm) $Al_2O_3$, utilizing the studless method of U.S. Pat. No. 5,326,429. That method includes the formation of bonding pads over the coil terminals, followed by deposition of the overcoat and etching vias through it to expose the bonding pads. Wire bonding to the bonding pads is accomplished through the vias. Otherwise, thick studs are formed at the coil lead terminals, followed by deposition of much thicker overcoat (35–60 μm), and back-lapping of the wafer to expose the studs. Bonding pads are then formed over the studs, thus completing the wafer fabrication process.

EXAMPLE

A toroidal TFH device, in accordance with the invention, comprises NiFe bottom and top magnetic poles with thickness of 3.5 μm, and constant yoke arm width of 50 μm. The length of the constant-width yoke arm portion is 90 μm, and the length of the fan-like yoke arm portion is 22 μm. The fan angle α is 45° (cf. FIG. 3(b)). The coil includes 30 turns consisting of 16 solenoid turns wrapped around the bottom pole, and 14 solenoid turns wrapped around the top pole. Each turn having a width of 3.0 μm and thickness of 3.0 μm (cross-section of 9.0 $μm^2$. The average length of a turn is 2×70 μm (including both sides of the yoke arm). The total coil resistance is given by the formula $$R=\rho.(l/A)$$

where R is the total coil resistance (in Ohms), ρ is the resistivity of the coil material (in Ohm-cm), l is the length of the coil (in cm), and A is the average cross-section of a turn (in $cm^2$). Using copper for the coil with $\rho=1.7\times10^{-6}$ Ohm-cm, and substituting the coil values in the formula, $$R=1.7\times10^{-6}(30\times2\times70\times10^{-4})/(9\times10^{-8})=7.93 \text{ Ohms.}$$

For comparison, a conventional 30 turn spiral coil TFH device has coil resistance of about 35 Ohms. The resistance per turn of the solenoid coil is only about 23% of the average spiral coil turn. Furthermore, the 30 turns of the toroidal TFH device produce the same read-back signal output as a 45 turn spiral coil conventional head. The latter has a total coil resistance of about 52 Ohms! Thus, the 30 turn toroidal TFH device of the invention provides the same output signal as a 45 turn conventional spiral coil TFH device, but has only about 15% of the total coil resistance of the latter! The inductance L of an electromagnetic circuit is given by:

$$L=N^2 \mu A/l$$

where N is the number of coil turns, μ is the permeability, A is the cross-section area of the coil, and l is the length of the coil. The inductance of the 30 turn toroidal TFH device is less than 44% of the 45 turn conventional spiral coil TFH device, based on the number of coil turns alone. In addition, the spiral coil inductance is even larger (particularly at high frequencies, when μ of the core rolls-off) due to its larger cross-section A. Since the circuit resonance is proportional to $(1/L)^{1/2}$, the lower inductance of the 30 turn toroidal head facilitates at least 50% increase of the feasible bandwidth over the conventional 45 turn spiral coil device.

While the invention has been particularly described with reference to preferred embodiments, it will be understood by those skilled in the art that various changes in form and detail may be made therein without departing from the spirit, scope, and teaching of the invention. Accordingly, examples herein disclosed are to be considered merely as illustrative and the invention to be limited only as specified in the claims.

What is claimed is:

1. A thin film head (TFH) magnetic transducing device comprising:

a substrate;

a bottom magnetic pole disposed over said substrate, said bottom magnetic pole comprising a bottom pole-tip portion and a bottom back portion, said bottom back portion comprising a bottom elongated region, said bottom elongated region having a bottom back-end;

a non-magnetic gap layer deposited over at least said bottom pole-tip portion of said bottom magnetic pole;

a top magnetic pole disposed over said gap layer and over said bottom magnetic pole, said top magnetic pole substantially overlying said bottom magnetic pole, said top magnetic pole comprising a top pole-tip portion and a top back portion, said top back portion comprising a top elongated region and a transitioning top front portion extending between said top elongated region and said top pole-tip portion, said top pole-tip portion having a width smaller than a width of said top elongated region, said top elongated region having a top back-end, said bottom back portion and said top back portion being magnetically connected to each other at a back-closure contact area, said back-closure contact area being located within a back-closure region, said back-closure contact area extending along substantially an entire width of at least one of said top and bottom back-ends, said width of said top elongated region being not larger than a width of said bottom elongated region, said pole-tip portions terminating at an air bearing surface, said width of said top pole-tip portion and each of said top and bottom elongated regions being measured in a direction perpendicular to a magnetic flux direction therein during write operations, said width in each instance being parallel to said air bearing surface; and one or more of (a) a bottom solenoidal coil, comprising at least one turn, wrapped around said bottom magnetic pole and (b) a top solenoidal coil, comprising at least one turn, wrapped around said top magnetic pole.

2. A TFH device as recited in claim 1, wherein said one or more of (a) a bottom solenoidal coil and (b) a top solenoidal coil comprises one or more of:

(a) a bottom solenoidal coil comprising a first set of electrically conductive strips disposed below, and being insulated from, said bottom magnetic pole;

a second set of electrically conductive strips disposed above, and being insulated from, said bottom magnetic pole;

said first set of electrically conductive strips and said second set of electrically conductive strips being joined along the sides of said bottom magnetic pole in a manner to form a solenoidal coil wrapped around said bottom magnetic pole; and (b) a top solenoidal coil comprising a first set of electrically conductive strips disposed below, and being insulated from said top magnetic pole;

a second set of electrically conductive strips disposed above, and being insulated from, said top magnetic pole;

said first set of electrically conductive strips and said second set of electrically conductive strips being joined along the sides of said top magnetic pole in a manner to form a solenoidal coil wrapped around said top magnetic pole.

3. A TFH device as recited in claim 2 wherein said one or more or (a) a bottom solenoidal coil and (b) a top solenoidal coil comprises a bottom solenoidal coil wrapped around at least a portion of said bottom magnetic pole and a top solenoidal coil wrapped around at least a portion of said top magnetic pole.

4. A TFH device as recited in claim 3 wherein said top and bottom solenoidal coils have an equal number of turns.

5. A TFH device as recited in claim 3 wherein said top and bottom solenoidal coils have an unequal number of turns.

6. A TFH device as recited in claim 3 wherein at least one of said bottom solenoidal coil and top solenoidal coil has an axis which is substantially perpendicular to said air bearing surface.

7. A TFH device as recited in claim 2 wherein said one or more of (a) a bottom solenoidal coil and (b) a top solenoidal coil comprises one or more of:

(a) a bottom solenoidal coil comprising: a first set of electrically conductive strips disposed below, and being insulated from, said bottom magnetic pole;

a second set of electrically conductive strips disposed above, and being insulated from, said bottom magnetic pole;

bottom contact pads configured along the sides of said bottom magnetic pole; and (b) a top solenoidal coil comprising a first set of electrically conductive strips disposed below, and being insulated from, said top magnetic pole;

a second set of electrically conductive strips disposed above, and being insulated from, said top magnetic pole; and top contact pads configured along the sides of said top magnetic pole.

8. A TFH device as recited in claim 7 wherein one or more of said (a) bottom contact pads and (b) top contact pads comprises one or more of:

(a) bottom contact pads configured in a staggered manner along both sides of said bottom magnetic pole; and (b) top contact pads configured in a staggered manner along both sides of said top magnetic pole.

9. A TFH device as recited in claim 7 wherein said one or more of (a) a bottom solenoidal coil and (b) a top solenoidal coil comprises one or more of:

(a) a bottom solenoidal coil comprising: a first set of electrically conductive strips disposed below, and being insulated from, said bottom magnetic pole;

a second set of electrically conductive strips disposed above, and being insulated from, said bottom magnetic pole;

bottom contact pads configured along the sides of said bottom magnetic pole; and at least one insulation layer which extends on at least one side of said bottom magnetic pole to within a short distance from said bottom contact pads; and (b) a top solenoidal coil comprising a first set of electrically conductive strips disposed below, and being insulated from, said top magnetic pole;

a second set of electrically conductive strips disposed above, and being insulated from, said top magnetic pole;

top contact pads configured along the sides of said top magnetic pole; and at least one insulation layer which extends on at least one side of said top magnetic pole to within a short distance from said top contact pads.

10. A TFH device as recited in claim 2 wherein at least one of said bottom magnetic pole and said top magnetic pole comprises electroplated magnetic layers.

11. A TFH device as recited in claim 2 further comprising a magnetoresistive (MR) read element.

12. A TFH device as recited in claim 11 wherein said one or more of (a) a bottom solenoidal coil and (b) a top solenoidal coil comprises said top solenoidal coil.

13. A TFH device as recited in claim 11 wherein said one or more of (a) a bottom solenoidal coil and (b) a top, solenoidal coil comprises one or more of:

(a) a bottom solenoidal coil comprising at least a single turn; and wrapped around said top magnetic pole.

14. A TFH device as recited in claim 1 wherein a top distance between said air bearing surface and said top back-end is greater than a bottom distance between said air bearing surface and said bottom back-end such that said top back portion is wrapped around said bottom back portion.

15. A TFH device as recited in claim 14 wherein a difference between said top distance and said bottom distance does not exceed the thickness of said top back portion.

16. A TFH device as recited in claim 1 wherein said back-closure region has a length, measured perpendicular to said air bearing surface, which is equal to or larger than the thickness of the thinner of said top and bottom back portions.

17. A TFH device as recited in claim 16 wherein the length of said back-closure region is in the range of 1.2–2.0 times the thickness of the thinner of said top and bottom back portions.

18. A TFH device as recited in claim 1 further comprising an insulation layer between said top and bottom magnetic poles, there being no via formed in said insulation layer in said back-closure region in order to connect said top and bottom magnetic poles.

19. A TFH device as recited in claim 1 wherein at least one of said bottom magnetic pole and said top magnetic pole comprises a magnetic material selected from the group consisting of NiFe, CoZr, CoNbZr, CoTaZr, FeSi, FeAlSi, FeN, FeAlN, FeTaN, CoFe, CoNiFe, and CoFeB.

20. A TFH device as recited in claim 19 wherein at least one of said bottom magnetic pole and said top magnetic pole comprises a laminated structure consisting of alternating magnetic and non-magnetic layers.

21. A TFH device as recited in claim 20 wherein said non-magnetic layers comprise non-magnetic electrically insulating layers.

22. A TFH devices as recited in claim 1 wherein at least one of said bottom magnetic pole and said top magnetic pole comprises NiFe alloy.

23. A TFH device as recited in claim 1 wherein a width of said bottom elongated region is substantially equal to a width of said top elongated region, measured in any plane parallel to said air bearing surface.

24. A TFH device as recited in claim 1 wherein a width of each of said bottom elongated region and said top elongated region is substantially constant at any distance from said air bearing surface.

25. A TFH device as recited in claim 24 wherein a ratio between the width and length of each of said top and bottom elongated regions, said length being measured in a direction perpendicular to said air bearing surface, is within the range of 0.4–0.7.

26. A TFH device as recited in claim 1 wherein at least one of said top and bottom elongated regions is tapered along its length.

27. A TFH device as recited in claim 1 wherein said one or more of (a) a bottom solenoidal coil and (b) a top solenoidal coil comprises one or more of:
  (a) a bottom solenoidal coil being situated relative to said bottom magnetic pole in such a manner as to induce a magnetic flux parallel to a single hard axis direction, normal to said air bearing surface, substantially throughout said bottom magnetic pole during write operations; and
  (b) a top solenoidal coil being situated relative to said top magnetic pole in such a manner as to induce a magnetic flux parallel to a single hard axis direction, normal to said air bearing surface, substantially throughout said top magnetic pole during write operations.

28. A TFH device as recited in claim 27 wherein at least one of said one or more of (a) a bottom solenoidal coil and (b) a top solenoidal coil comprises an electrically conductive metal selected from the group consisting of Cu, Au, Pd, Pt, Ag, and Al.

29. A TFH device as recited in claim 27 wherein at least one of said one or more of (a) a bottom solenoidal coil and (b) a top solenoidal coil comprises an electrically conductive metal selected from the group consisting of Cu, Au, and Al.

30. A TFH device as recited in claim 1 wherein said one or more of (a) a bottom solenoidal coil and (b) a top solenoidal coil comprises one or more of:
  (a) a bottom solenoidal coil being closely wrapped around said bottom magnetic pole along substantially the entire distance between an onset point of said bottom back portion and said back-closure region; and
  (b) a top solenoidal coil being closely wrapped around said top magnetic pole along substantially the entire distance between an onset point of said top back portion and said back-closure region.

31. A TFH device as recited in claim 1 wherein at least one of said bottom magnetic pole and said top magnetic pole comprises sputter deposited or evaporation-deposited layers.

32. A TFH device as recited in claim 1 wherein neither of said bottom magnetic pole and said top magnetic pole comprises a wing portion.

33. A TFH device as recited in claim 1 wherein said back-closure contact area extends along at least 90% of the width of at least one of said top and bottom back-ends.

34. A TFH device as recited in claim 1 wherein said back-closure contact area extends along at least 95% of the width of at least one of sa d top and bottom back-ends.

35. A TFH device as recited in claim 1 wherein said one or more of (a) a bottom solenoidal coil and (b) a top solenoidal coil comprises said top solenoidal coil, and wherein said bottom magnetic pole comprises a part of a magnetoresistive (MR) read device.

36. A TFH device as recited in claim 1 wherein said bottom and top magnetic poles are associated with only a single TFH transducing device.

37. A TFH device as recited in claim 1 wherein said top magnetic pole overlaps and is wrapped around said bottom back-end within said back-closure region.

38. A thin film head (TFH) magnetic transducing device comprising:
  a substrate;
  a bottom magnetic pole formed over said substrate, said bottom magnetic pole having a predetermined width and length, said length extending between a first end and a second end of said bottom magnetic pole;
  a top magnetic pole formed over, and substantially overlying, said bottom magnetic pole, said top magnetic pole being disposed substantially above said bottom magnetic pole, relative to said substrate, said top magnetic pole comprising a top pole-tip and a top back portion each having a predetermined width measured in a direction parallel to an air bearing surface, said width of said top pole-tip being smaller than said width of said top back portion, said top magnetic pole having a predetermined width and length, said length extending between a first end and a second end of said top magnetic pole, wherein said length of said top magnetic pole is larger than said length of said bottom magnetic pole, such that said top back portion is wrapped around said second end of said bottom magnetic pole, said second end of said top magnetic pole being connected to said second end of said bottom magnetic pole in a back-closure region; and
  one or more of (a) a bottom solenoidal coil wrapped around said bottom magnetic pole and (b) a top solenoidal coil wrapped around said top magnetic pole;
  wherein said first ends coincide with said air bearing surface, a transducing gap being formed between said first ends, and wherein said width of said top magnetic pole is no greater than said width of said bottom magnetic pole measured in any plane parallel to said air bearing surface.

39. A thin film head (TFH) magnetic transducing device comprising:
  a substrate;
  a bottom magnetic pole formed over said substrate, said bottom magnetic pole having a predetermined width and length, said length extending between a first end and a second end of said bottom magnetic pole;
  a top magnetic pole formed over, and substantially overlying, said bottom magnetic pole, said top magnetic pole being disposed substantially above said bottom magnetic pole, relative to said substrate, said top magnetic pole comprising a top pole-tip and a top back portion each having a predetermined width measured in a direction parallel to an air bearing surface, said width of said top pole-tip being smaller than said width of said top back portion, said top magnetic pole having a predetermined width and length, said length extending between a first end and a second end of said top magnetic pole, wherein said top magnetic pole overlaps and is wrapped around said second end of said bottom magnetic pole, said second end of said top magnetic pole being connected to said second end of said bottom magnetic pole in a back-closure region; and
  one or more of (a) a bottom solenoidal coil wrapped around said bottom magnetic pole and (b) a top solenoidal coil wrapped around said top magnetic pole;
  wherein said first ends coincide with said air bearing surface, a transducing gap being formed between said first ends, and wherein said width of said top magnetic pole is no greater than said width of said bottom magnetic pole measured in any plane parallel to said air bearing surface.

40. A thin film head (TFH) magnetic transducing device comprising:

a substrate;

a bottom magnetic pole disposed over said substrate, said bottom magnetic pole comprising a bottom pole-tip portion and a bottom back portion, said bottom back portion terminating at a bottom back-end;

a non-magnetic gap layer deposited over at least said bottom pole-tip portion of said bottom magnetic pole;

a top magnetic pole disposed over said gap layer, said top magnetic pole comprising a top pole-tip, a top back portion and a top transition portion, said top back portion terminating at a top back-end, said bottom back portion and said top back portion being magnetically connected to each other at an area of contact within a back-closure region, said top and bottom pole-tips terminating at an air bearing surface;

a first solenoidal coil wrapped around said bottom magnetic pole; and a second solenoidal coil wrapped around said top magnetic pole, said first and second solenoidal coils being connected in series, each of said first and second solenoidal coils comprises at least one bottom layer and at least one top layer of conductive strips, each of said first and second solenoidal coils includes contact pads for connecting successive coil layers, configured along sides of said bottom and top magnetic poles, respectively, wherein said contact pads are configured in a staggered manner along at least one side of each of said bottom and top magnetic poles;

wherein said bottom and top back portions have a substantially uniform width $W_1$ and said top pole-tip has a width $W_{2T}$, and $W_1$ is greater than $W_{2T}$, said top transition portion being tapered to accommodate the difference between $W_1$ and $W_{2T}$, said top magnetic pole being disposed substantially above said bottom magnetic pole, relative to said substrate, wherein said top magnetic pole substantially overlying said bottom magnetic pole in all regions, including at least a portion of said back-closure region, and wherein said area of contact also has a width substantially equal to $W_1$.

* * * * *